United States Patent

Nakajima

[11] Patent Number: 5,940,781
[45] Date of Patent: Aug. 17, 1999

[54] TIRE PRESSURE DROP DETECTING DEVICE

[75] Inventor: Yoshio Nakajima, Itami, Japan

[73] Assignees: Sumitomo Rubber Industries, Ltd., Hyogo; Sumitomo Electric Industries, Ltd., Osaka, both of Japan

[21] Appl. No.: 09/030,927

[22] Filed: Feb. 26, 1998

[30] Foreign Application Priority Data

Mar. 7, 1997 [JP] Japan .................................. 9-053612

[51] Int. Cl.⁶ .................................................. B06C 23/00
[52] U.S. Cl. .............................. 702/98; 702/96; 702/140; 340/442; 340/443; 340/444; 73/146.2; 73/146.4; 73/146.5
[58] Field of Search ................................. 702/98, 140, 96; 340/442, 444, 443, 445; 73/146.2–146.5; 701/70

[56] References Cited

U.S. PATENT DOCUMENTS

| | | | |
|---|---|---|---|
| 5,578,984 | 11/1996 | Nakajima | 340/444 |
| 5,591,906 | 1/1997 | Okawa et al. | 73/146.5 |
| 5,629,478 | 5/1997 | Nakajima et al. | 73/146.2 |
| 5,710,539 | 1/1998 | Iida | 340/444 |

FOREIGN PATENT DOCUMENTS

| | | |
|---|---|---|
| 63-305011 | 12/1988 | Japan . |
| 4-212609 | 8/1992 | Japan . |
| 7-156621 | 6/1995 | Japan . |
| 10-909 | 1/1998 | Japan . |

Primary Examiner—John Barlow
Assistant Examiner—Hien Vo
Attorney, Agent, or Firm—Rabin & Champagne, P.C.

[57] ABSTRACT

An apparatus for detecting the drop in air pressure of any of tires mounted on a vehicle. The device finds, in finding an initial correction factor for eliminating the effect of a difference in effective rolling radius depending on an initial difference among the tires on the rotational angular velocities of the tires, the ratio of the rotational angular velocities of a predetermined pair of the tires as an initial correction factor, averaging and updating the initial correction factor for each sampling period, and taking the initial correction factor found when the number of times of the updation reaches a predetermined number of times as the final initial correction factor. When it is judged that the air pressure of any of the tires drops before the final initial correction factor is found, the calculation of the initial correction factor is stopped.

5 Claims, 7 Drawing Sheets

F I G. 1
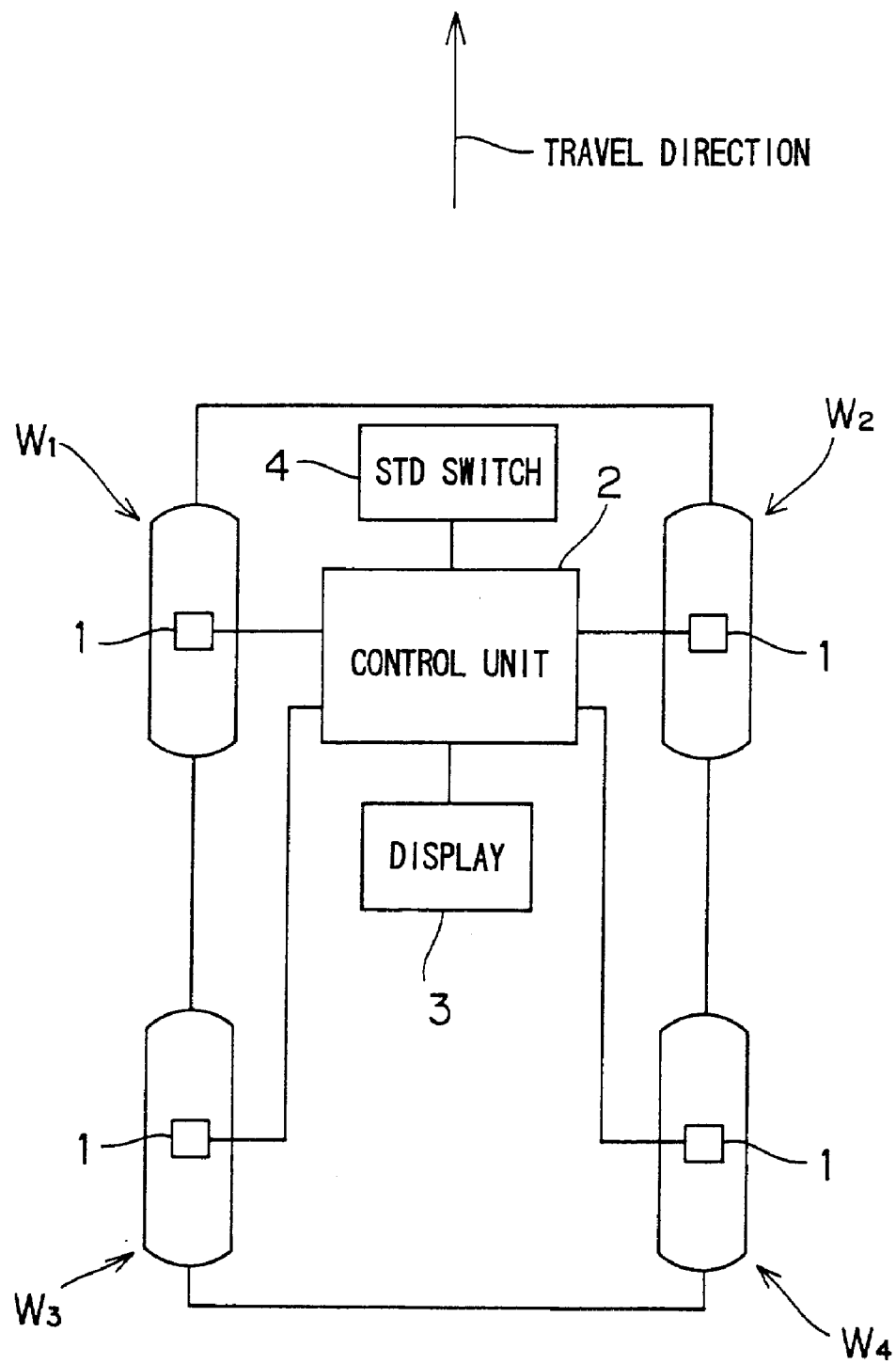

TIRE PRESSURE DROP DETECTING DEVICE

BACKGROUND OF THE INVENTION

1. Field of the Invention

The present invention relates to a device for detecting the drop in air pressure of any of tires mounted on a vehicle.

2. Description of the Related Art

In recent years, as an example of a safety device of a four-wheel vehicle such as an automobile or a truck, devices for detecting the drop in air pressure of any of tires have been developed, and some of them have been put to practical use.

An example of a method of detecting the drop in air pressure of any of tires is a method utilizing a difference among the respective rotational angular velocities F1, F2, F3 and F4 of four tires W1, W2, W3 and W4 mounted on a vehicle. The tires W1 and W2 are respectively right and left front tires, and the tires W3 and W4 are respectively right and left rear tires.

In this detecting method, on the basis of a signal outputted from a wheel speed sensor mounted on each of the tires Wi (i=1, 2, 3 or 4), the rotational angular velocity Fi of the tire Wi is detected for each predetermined sampling period.

If the effective rolling radii of all the tires Wi are equal, and the vehicle is linearly traveling, the detected rotational angular velocities Fi of the tires Wi should be equal. The effective rolling radius is a value obtained by dividing the distance the tire Wi freely rolling in a loaded state advances by one rotation by $2\pi$.

The effective rolling radius of the tire Wi changes depending on the change in the air pressure of the tire Wi, for example. That is, when the air pressure of the tire Wi drops, the effective rolling radius is smaller than that at the time of normal internal pressure. Consequently, the rotational angular velocity Fi of the tire Wi whose air pressure has dropped is higher than that at the time of normal internal pressure. Therefore, the drop in the air pressure of the tire Wi can be judged on the basis of the difference among the rotational angular velocities Fi.

A judgment expression used in detecting the drop in the air pressure of the tire Wi on the basis of the difference among the rotational angular velocities Fi is the following equation (1), for example (see JP-A-63-305011, JP-A-4-212609, etc.):

$$D = \frac{F1 + F4 - F2 - F3}{F1 + F2 + F3 + F4} \times 200 \tag{1}$$

If the effective rolling radii of all the tires Wi are equal, all the rotational angular velocities Fi are equal (F1=F2=F3=F4). Consequently, a judged value D is zero. Therefore, thresholds Dth1 and Dth2 (where Dth1 and Dth2>0) are set. When the conditions given by the following expression (2) are satisfied, it is judged that the air pressure of any of the tires Wi has dropped. When the conditions are not satisfied, it is judged that all the tires Wi have normal internal pressure.

$$D < -Dth1 \text{ or } D > Dth2 \tag{2}$$

The effective rolling radii of the actual tires include a variation within a production tolerance of the tires (hereinafter referred to as an "initial difference"). That is, even if all the four tires Wi have normal internal pressure, the effective rolling radii of the four tires Wi differ depending on the initial difference. Correspondingly, the rotational angular velocities Fi of the tires Wi vary. As a result, the judged value D may be a value other than zero. Therefore, it may be erroneously detected that the air pressure has dropped, although it has not drop. In order to detect the drop in the air pressure with high precision, therefore, it is necessary to eliminate the effect of the initial difference from the detected rotational angular velocities Fi.

As a technique for eliminating the effect of the initial difference from the rotational angular velocities Fi, it is considered that a technique disclosed in JP-A-7-156621 is applied. In the technique disclosed in the unexamined publication, initial correction factors K1 to K3 for correcting a variation depending on an initial difference among tires Wi are found (this processing for finding the initial correction factors K1 to K3 is referred to as "STD (Straight Running Determination) Processing"). The rotational angular velocities Fi are corrected on the basis of the found initial correction factors K1 to K3. Consequently, the effect of the initial difference is eliminated from the rotational angular velocities Fi. It is Judged whether or not the air pressure of any of the tires has dropped on the basis of rotational angular velocities after the correction.

More specifically, in the above-mentioned proposed technique, the initial correction factors K1 to K3 are respectively found as the average values of the ratios of the rotational angular velocities of the right and left front tires, the right and left rear tires and the front and rear tires which are found in each sampling period, as expressed by the following equations (3) to (5), with the pressing of an STD switch by a driver taken as calculation starting conditions. In the following equations (3) to (5), n corresponds to the number of times of calculation. $\Sigma$ denotes the total in the case of p=1 to p=n.

$$K1 = \{\Sigma(F1/F2)_P\}/n \tag{3}$$

$$K2 = \{\Sigma(F3/F4)_P\}/n \tag{4}$$

$$K3 = \{\Sigma(F1/F3)_P\}/n \tag{5}$$

In order to thus find the initial correction factors K1 to K3, a certain time period is required. On the other hand, assuming that air pressure drop judgment processing is not performed until the final initial correction factors K1 to K3 are found, even if the air pressure of any of the tires drops during the STD processing, it is impossible to detect the drop in the air pressure.

SUMMARY OF THE INVENTION

In order to deal with the above-mentioned problems, it is considered that a technique proposed in a Japanese patent application Serial No. 8-151247 (JP-A-10-909 published on Jan. 6, 1998) by the assignee of this application is applied. In the proposed technique, the ratio of the rotational angular velocities found in each sampling period is taken as a temporary initial correction factor, the drop in air pressure of any of tires is judged for each sampling period on the basis of the initial correction factor, and a warning is provided if the air pressure of any of the tires drops. In this case, the accuracy of each of initial correction factors K1 to K3 is not sufficient immediately after the calculation thereof is started. However, thresholds Dth1 and Dth2 for judgment are updated depending on the accuracy of each of the initial correction factors K1 to K3, thereby preventing the accuracy of air pressure drop judgment from being decreased.

In the above-mentioned proposed technique, even in situations where the final initial correction factors K1 to K3 are not found, it is thus judged whether or not the air pressure of any of the tires drops. Consequently, the air pressure of the tire may, in some cases, actually drop during STD processing, providing a warning. In this case, the rotational angular velocities Fi of the tires Wi vary depending on not only an initial difference but also the effect of the drop in the air pressure. Consequently, the amount of variation due to the drop in the air pressure is accumulated in the initial correction factors K1 to K3 every time averaging calculation for finding the initial correction factors K1 to K3 is performed, so that the initial correction factors K1 to K3 finally found may be incorrect. When the drop in the air pressure is detected during the STD processing, therefore, some measures must be taken.

As one of the measures, it is considered, where the drop in the air pressure is detected during the STD processing, that a driver presses an STD switch to newly find the initial correction factors K1 to K3 again. When the air pressure has dropped, however, a warning is merely provided. Therefore, the driver cannot judge whether or not the warning is provided during the STD processing. To ensure that the calculation of the initial correction factors K1 to K3 is reliably performed, the STD switch may be pressed every time the tire is filled with air pressure after the warning is provided. This is not very preferable because it causes the driver to perform complicated operation. Unless the driver presses the STD switch, however, the incorrect initial correction factors K1 to K3 in which the amount of variation due to the effect of the drop in the air pressure is accumulated continue to be used in the subsequent air pressure drop judgment processing, so that an erroneous warning is not prevented from being provided.

An object of the present invention is to provide a tire pressure drop detecting device capable of preventing an erroneous warning from being provided without requiring complicated operation by a driver.

A tire pressure drop detecting device according to the present invention comprises rotational angular velocity detection means for detecting the rotational angular velocity of each of tires for each predetermined sampling period, initial correction factor calculation means for finding an initial correction factor for eliminating the effect of a difference in effective rolling radius depending on an initial difference among the tires on the rotational angular velocities, correction means for correcting the rotational angular velocities detected by the rotational angular velocity detection means for each sampling period on the basis of the initial correction factor found by the initial correction factor calculation means, judgment means for finding a judged value on the basis of the rotational angular velocities corrected by the correction means and judging whether or not the air pressure of any of the tires has dropped on the basis of the found judged value, and calculation stop means for stopping the calculation in the initial correction factor calculation means when it is judged in the judgment means that the air pressure of any of the tires has dropped at timing before the final initial correction factor is found in the initial correction factor calculation means. The initial correction factor calculation means comprises means for finding as the initial correction factor the ratio of the rotational angular velocities of a predetermined pair of the tires on the basis of the rotational angular velocities detected by the rotational angular velocity detection means, means for averaging and updating the initial correction factor for each sampling period, and means for taking the initial correction factor found when the number of times of the updation reaches a predetermined number of times as the final initial correction factor.

In the present invention, when it is judged that the air pressure of any of the tires has dropped in the steps before finding the final initial correction factor, the calculation of the initial correction factor is stopped. Consequently, it is possible to minimize the effect of the drop in the air pressure on the initial correction factor. Since a variation among the rotational angular velocities to be thereafter corrected can be minimized, therefore, it is possible to minimize the number of times of erroneous judgment of the drop in the air pressure, without causing the driver to perform a complicated operation.

The device according to one embodiment of the present invention further comprises range judgment means for judging whether or not the judged value found in the judgment means is less than a predetermined value after the calculation of the initial correction factor is stopped by the calculation stop means, and calculation resumption processing means for judging that the air pressure of the tire is returned to normal internal pressure when it is judged in the range judgment means that the judged value is less than the predetermined value and performing processing relating to the resumption of the calculation of the initial correction factor in the initial correction factor calculation means.

After the air pressure of any of the tires has dropped, the tire is filled with air, so that the air pressure of the tire is returned to normal internal pressure in most cases. On the other hand, if all the tires have normal internal pressure, a judged value found on the basis of the rotational angular velocities corrected by the initial correction factor which is least affected by the drop in the air pressure takes a value in the vicinity of a predetermined value (for example, zero).

In the present invention, when it is judged that the judged value is less than a predetermined value after the calculation of the initial correction factor is stopped, therefore, it is judged that the air pressure of the tire is returned to normal internal pressure, so that the processing relating to the resumption of the calculation of the initial correction factor is performed. That is, the calculation of the initial correction factor is automatically resumed from the beginning, for example.

Consequently, it is possible to obtain a correct initial correction factor. Therefore, the rotational angular velocities can be accurately corrected, whereby the drop in the air pressure can be judged with high precision. Accordingly, the number of times of the erroneous judgment can be further minimized without causing the driver to perform complicated operation.

The device according to one embodiment of the present invention further comprises sign judgment means for judging whether or not the sign of a judged value found in the judgment means after the calculation of the initial correction factor is stopped by the calculation stop means (hereinafter referred to as a "first judged value") differs from the sign of a judged value found in the judgment means when the calculation of the initial correction factor is stopped by the calculation stop means (hereinafter referred to as a "second judged value"), and calculation resumption processing means for judging that the air pressure of the tire is returned to normal internal pressure when it is judged in the sign judgment means that the sign of the first judged value and the sign of the second judged value differ from each other and performing processing relating to the resumption of the calculation of the initial correction factor in the initial correction factor calculation means.

When the air pressure of any of the tires has dropped, the rotational angular velocity of the tire is increased, as compared with that at the time of normal internal pressure. The initial correction factor calculated using the increased rotational angular velocity takes a value different from that at the time of normal internal pressure. In this case, the judged value is increased by the amount of increase in the rotational angular velocity. Further, it is decreased by the amount of change in the initial correction factor. On the other hand, if the air pressure of the tire is returned to normal internal pressure, the amount of increase in the rotational angular velocity reaches zero. However, the initial correction factor is unchanged, as compared with that in a case where the air pressure of the tire has dropped because the subsequent calculation is stopped. Assuming that a judged value at normal time takes a value in the vicinity of zero, therefore, when the air pressure of the tire is returned to normal internal pressure, the sign of the judged value found at the time of normal internal pressure and the sign of the judged value found in a case where the air pressure drops differ from each other.

In the present invention, therefore, when the sign of the judged value differs from the sign in a case where the air pressure drops, it is judged that the air pressure of the tire is returned to normal internal pressure, so that the same processing relating to the resumption of the calculation of the initial correction factor as described above is performed. Consequently, it is possible to effectively prevent the erroneous judgment without causing the driver to perform complicated operation.

The "sign of the judged value" indicates whether the judged value is larger or smaller than a predetermined value which it should take at normal time in this case. The predetermined value may be zero or a value other than zero depending on an operation expression of the judged value.

The device according to the embodiment of the present invention further comprises power supply turn-on judgment means for judging whether or not the power supply is turned on not less than a predetermined number of times after the calculation of the initial correction factor is stopped by the calculation stop means, and calculation resumption processing means for judging that the air pressure of the tire is returned to normal internal pressure when it is judged in the power supply turn-on judgment means that the power supply is turned on not less than a predetermined number of times and performing processing relating to the resumption of the calculation of the initial correction factor in the initial correction factor calculation means.

According to the construction, when it is judged that the power supply is turned on not less than a predetermined number of times, it is judged that the air pressure of the tire is returned to normal internal pressure, so that the same processing relating to the resumption of the calculation of the initial correction factor as described above is performed. After the air pressure of any of the tires has dropped, the tire is immediately filled with air so that the air pressure of the tire is returned to normal internal pressure, as described above. When the power supply is turned on not less than a predetermined number of times, therefore, it is considered that the air pressure of the tire is generally normal internal pressure. Accordingly, it is possible to further prevent the erroneous judgment by the above-mentioned construction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the construction of a tire pressure drop detecting device according to one embodiment of the present invention;

DESCRIPTION OF THE PREFERRED EMBODIMENTS

Figure 2:
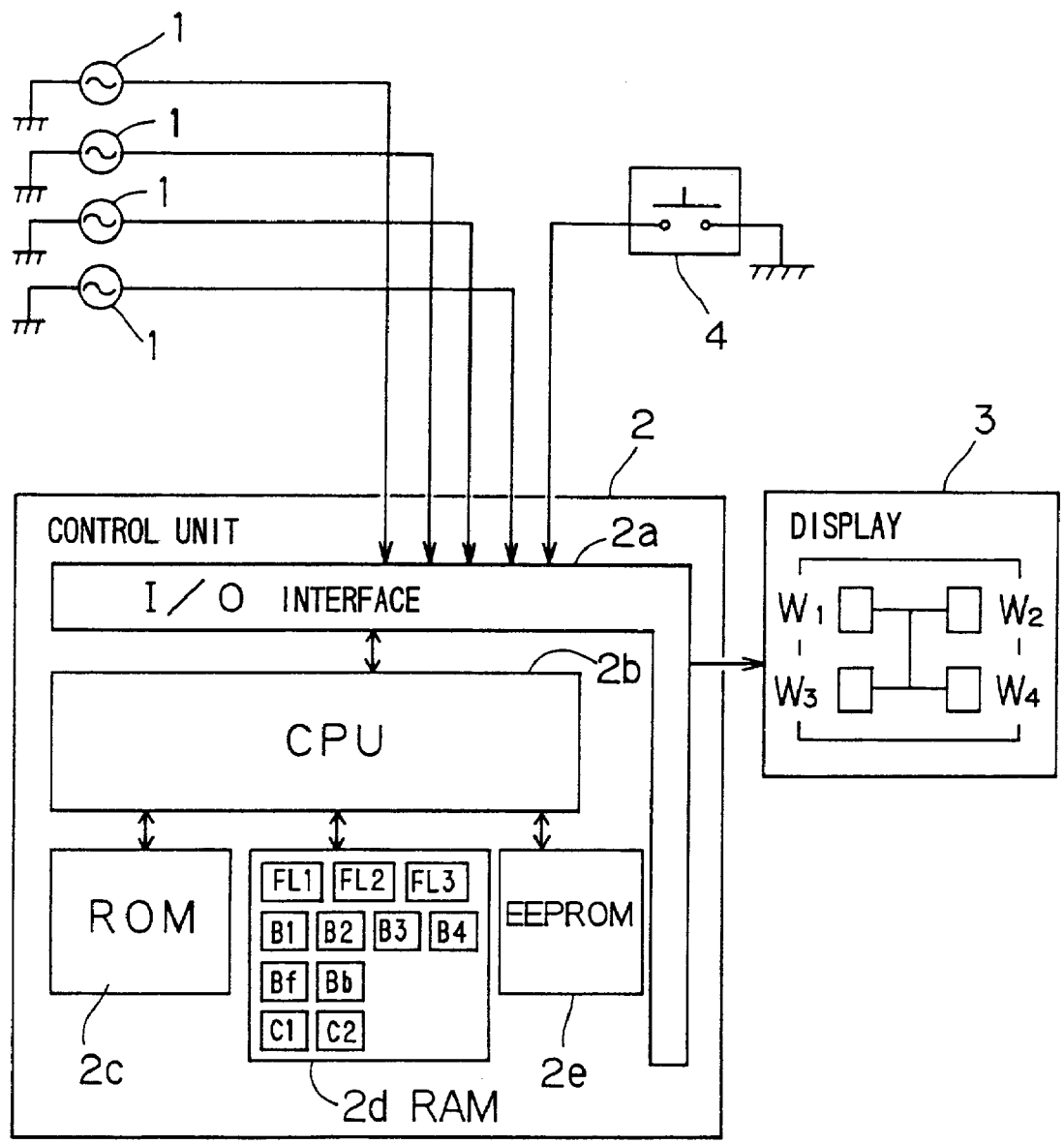
FIG. 2 is a block diagram showing the electrical construction of the tire pressure drop detecting device.

FIG. 1 is a block diagram showing the construction of a tire pressure drop detecting device according to one embodiment of the present invention. The tire pressure drop detecting device judges whether or not the air pressure of any of four tires W1, W2, W3 and W4 provided in a four-wheel vehicle has dropped. The tires W1 and W2 respectively correspond to right and left front tires. The tires W3 and W4 respectively correspond to right and left rear tires.

A wheel speed sensor 1 is provided in relation to each of the tires W1, W2, W3 and W4. Outputs of the wheel speed sensors 1 are fed to a control unit 2.

A display 3 is connected to the control unit 2. The display 3 is for reporting the tire Wi (i=1, 2, 3, or 4) whose air pressure has dropped, and is constituted by a liquid crystal display, a plasma display, a CRT (Cathode-Ray Tube), or the like.

An STD switch 4 is also connected to the control unit 2. The STD switch 4 is operated by a driver in finding an initial correction factor KJ (j=1, 2 or 3) for eliminating the effect of an initial difference among the tires Wi. The initial difference is a variation in effective rolling radius within a production torelance of the tires Wi.

FIG. 2 is a block diagram showing the electrical construction of the tire pressure drop detecting device. The control unit 2 is constituted by a microcomputer comprising an I/o interface 2a, a CPU 2b, a ROM 2c, a RAM 2d, and an EEPROM 2e.

The I/O interface 2a is required to deliver signals to or from external devices such as the wheel speed sensors 1 and the STD switch 4. The CPU 2b performs DWS processing, for example, in accordance with a control operation program stored in the ROM 2c. The DWS processing includes initial processing for initialization, STD processing for finding the initial correction factors K1 to K3 for eliminating the effect of a relative variation in effective rolling radius depending on the initial difference among the tires Wi from the rotational angular velocities by averaging processing, and normal judgment processing for judging whether or not the air pressure of any of the tires has dropped.

The RAM 2d is one to which data or the like is temporarily written when the CPU 2b performs a control operation and from which the written data or the like is read out. A part of a storage area of the RAM 2d is utilized as buffers B1, B2, B3 and B4 as well as Bf and Bb storing data in the step of finding the initial correction factors K1 to K3. Another part of the storage area of the RAM 2d is utilized as an STD counter Cl for counting the number of times of calculation of the initial correction factors K1 to K3 in the STD processing and an Ig counter C2 for recording the number of times of turn-on of an ignition switch (Ig). Still another part of the storage area of the RAM 2d is utilized as an STD abnormal termination flag FL1 indicating whether or not the calculation of the initial correction factors K1 to K3 in the STD processing is terminated halfway, an STD start flag FL2 indicating whether or not the calculation of the initial correction factors K1 to K3 is to be started from the beginning, and a warning provision flag FL3 indicating whether or not a warning is to be provided.

The EEPROM 2e stores the initial correction factors K1 to K3 found by the STD processing, and stores the STD abnormal termination flag FL1 and a count value CIg of the Ig counter C2.

The wheel speed sensor 1 outputs a pulse signal corresponding to the speed of rotation of the tire Wi (hereinafter referred to as "wheel speed pulses"). In the CPU 2b, the rotational angular velocity Fi of each of the tires Wi is detected for each predetermined sampling period $\Delta T$ (sec) (for example, $\Delta T=1$) on the basis of the wheel speed pulses outputted from the wheel speed sensor 1.

Figure 3:
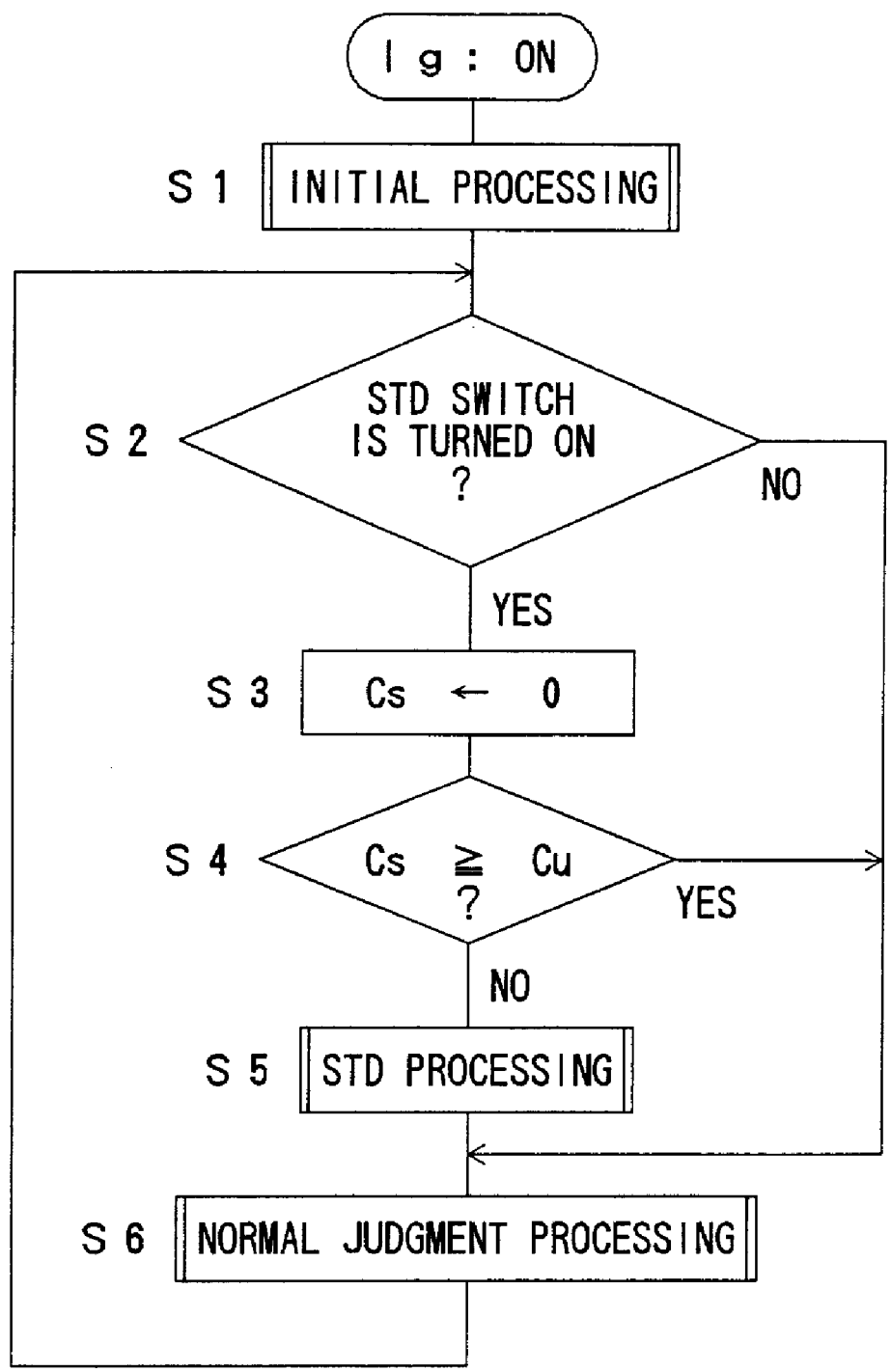
FIG. 3 is a flow chart for explaining DWS processing.

FIG. 3 is a flow chart for explaining the flow of the entire DWS processing in the tire pressure drop detecting device. The DWS processing is performed by the control unit 2 by the CPU 2b operating in accordance with the predetermined program stored in the ROM 2c. In the following description, it is presupposed that an objective vehicle is an FF (front engine front drive) vehicle.

When the ignition switch is turned on, the CPU 2b performs initial processing only once (step S1). It is then judged whether or not the STD switch 4 is turned on (step S2). If the STD switch 4 is not turned on, the normal judgment processing is performed during one sampling period $\Delta T$ (step S6). If the STD switch 4 is turned on, it is considered that an instruction to start the STD processing is given, to clear a count value Cs of the STD counter C1 to zero (step S3). Thereafter, it is judged whether or not the count value Cs of the STD counter C1 reaches a maximum value Cu (step S4). Unless the count value Cs reaches the maximum value Cu, the STD processing and the normal judgment processing are performed during one sampling period $\Delta T$ (steps S5 and S6). In other words, the STD processing and the normal judgment processing are respectively performed for each sampling period 66 T until the number of times of the calculation of the initial correction factors K1 to K3 reaches Cu. During this time, in the STD processing, averaging processing is performed for each sampling period $\Delta T$ utilizing the initial correction factors found in the preceding sampling period $\Delta T$, so that temporary initial correction factors K1 to K3 are found. On the other hand, in the normal judgment processing, the rotational angular velocities Fi are corrected on the basis of the temporary initial correction factors K1 to K3, so that air pressure drop judgment processing is performed on the basis of rotational angular velocities after the correction. If the count value Cs reaches the maximum value Cu, it is considered that the final initial correction factors K1 to K3 are found, so that only the normal judgment processing is performed. That is, after the average number of times reaches Cu, the rotational angular velocities Fi are corrected on the basis of the final initial correction factors K1 to K3 in the normal judgment processing.

When the air pressure of any of the tires has dropped, the effect of the drop in the air pressure is exerted on the rotational angular velocity of the tire. The rotational angular velocities Fi of the four tires Wi vary depending on the effect. On the other hand, in order to find the correct initial correction factors K1 to K3 in the STD processing, it is required that the four rotational angular velocities Fi vary depending on only the initial difference. If the air pressure of any of the tires drops before the final initial correction factors K1 to K3 are found, therefore, the final initial correction factors K1 to K3 become incorrect. Therefore, in the DWS processing, when the air pressure of the tire has dropped before the final initial correction factors K1 to K3 are found, the abnormal termination flag FL1 is set, to stop the calculation of the initial correction factors K1 to K3 halfway.

After the drop in the air pressure is detected, the driver generally fills the tire whose air pressure has dropped with air. Since the air pressure of the tire becomes normal internal pressure in this case, the effect of the drop in the air pressure is not exerted on the subsequent rotational angular velocities Fi of the tires Wi. In the DWS processing, therefore, it is automatically detected that the air pressure of the tire is returned to normal internal pressure, to automatically resume the calculation of the initial correction factors K1 to K3 which has been stopped from the beginning.

Figure 4:
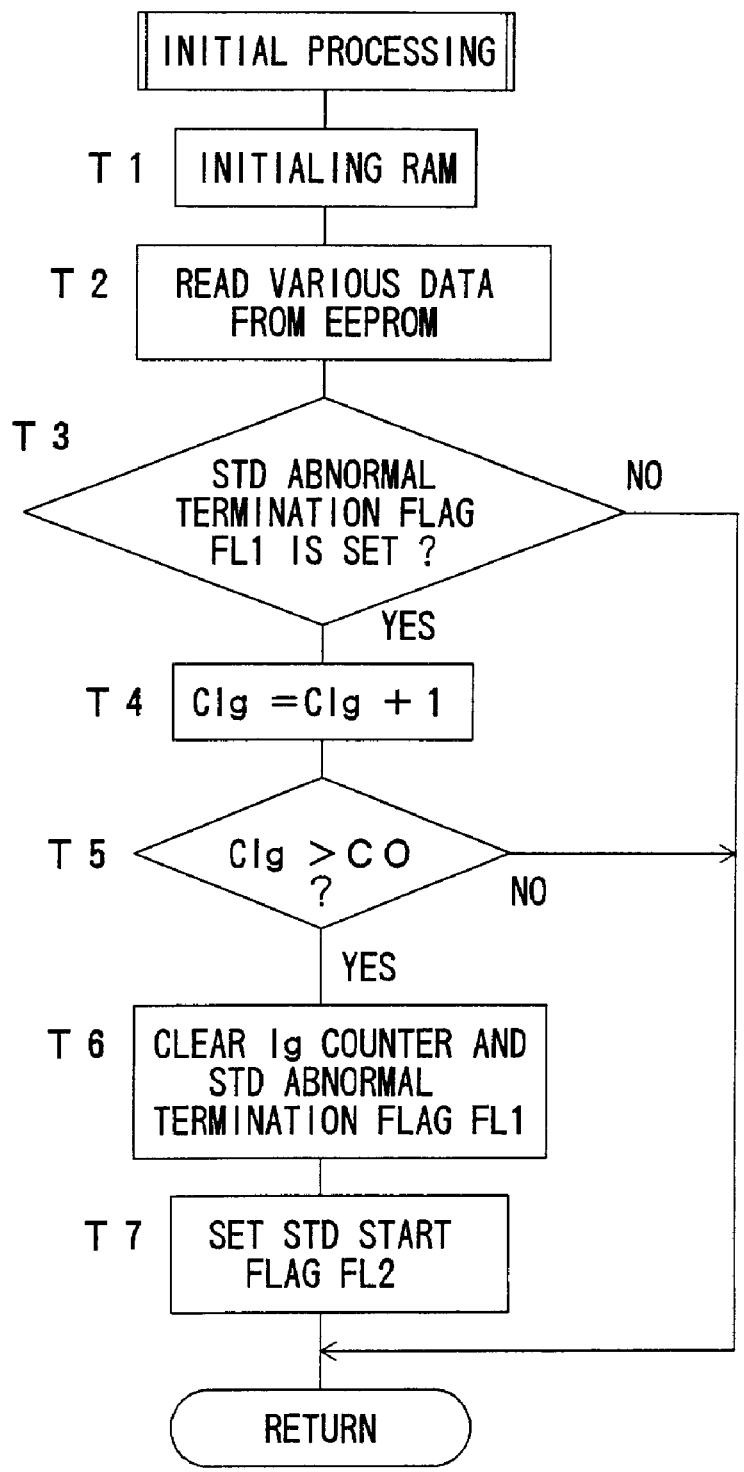
FIG. 4 is a flow chart for explaining initial processing.

FIG. 4 is a flow chart for explaining the initial processing. The CPU 2b initializes the buffers B1 to B4 as well as Bf and Bb in the RAM 2d (step T1), after which the value of the STD abnormal termination flag FL1 and the count value CIg of the Ig counter C2 are read from the EEPROM 2e, and the data are held once in a work area in the RAM 2d (step T2). Thereafter, it is judged whether or not the STD abnormal termination flag FL1 held in the RAM 2d is set (step T3). If the STD abnormal termination flag FL1 is not set, the initial processing is terminated without performing any processing.

If the STD abnormal termination flag FL1 is set, the count value CIg of the Ig counter C2 is incremented (step T4). Further, in order to judge whether or not the air pressure of the tire is returned to normal internal pressure, it is judged whether or not the count value CIg is not less than a predetermined value CO (for example, CO=100) (step T5). That is, if a sufficient time period for the ignition switch to be turned on a predetermined number of times from the time when the STD abnormal termination flag FL1 is set has elapsed since the drop in the air pressure of the tire was detected, it is considered that it may be judged that the air pressure is returned to normal internal pressure. If the count value CIg is not less than the predetermined value CO, therefore, the CPU 2b clears the Ig counter C2 and the STD abnormal termination flag FL1 (step T6), and sets the STD start flag FL2 (step T7). Thereafter, the count value CIg of the Ig counter C2 is stored in the EEPROM 2e. If the count value CIg is less than the predetermined value CO, the count value CIg of the Ig counter C2 is stored in the EEPROM 2e, after which the initial processing is terminated.

Figure 5:
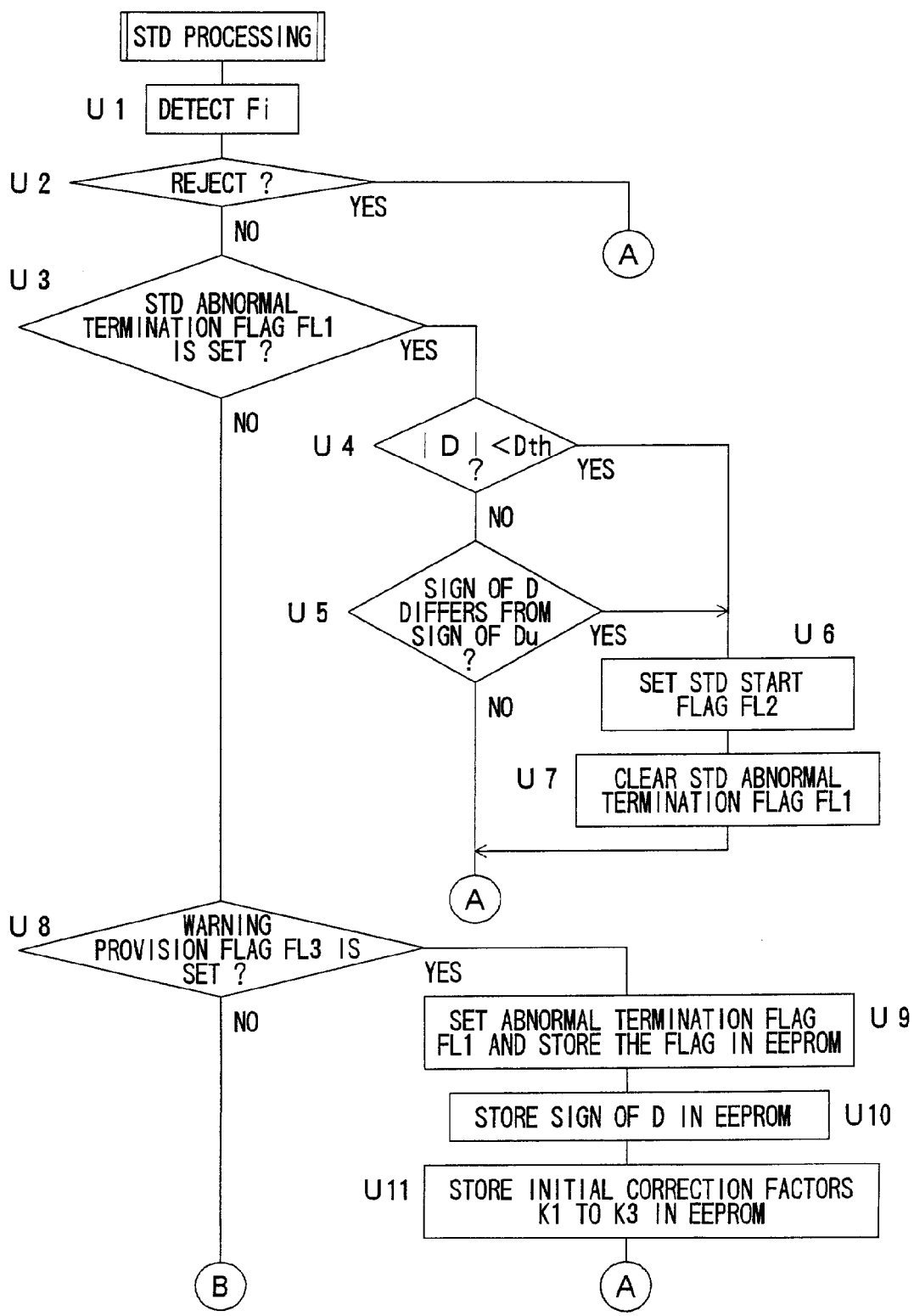
FIGS. 5 and 6 are flow charts for explaining STD processing.
Figure 6:
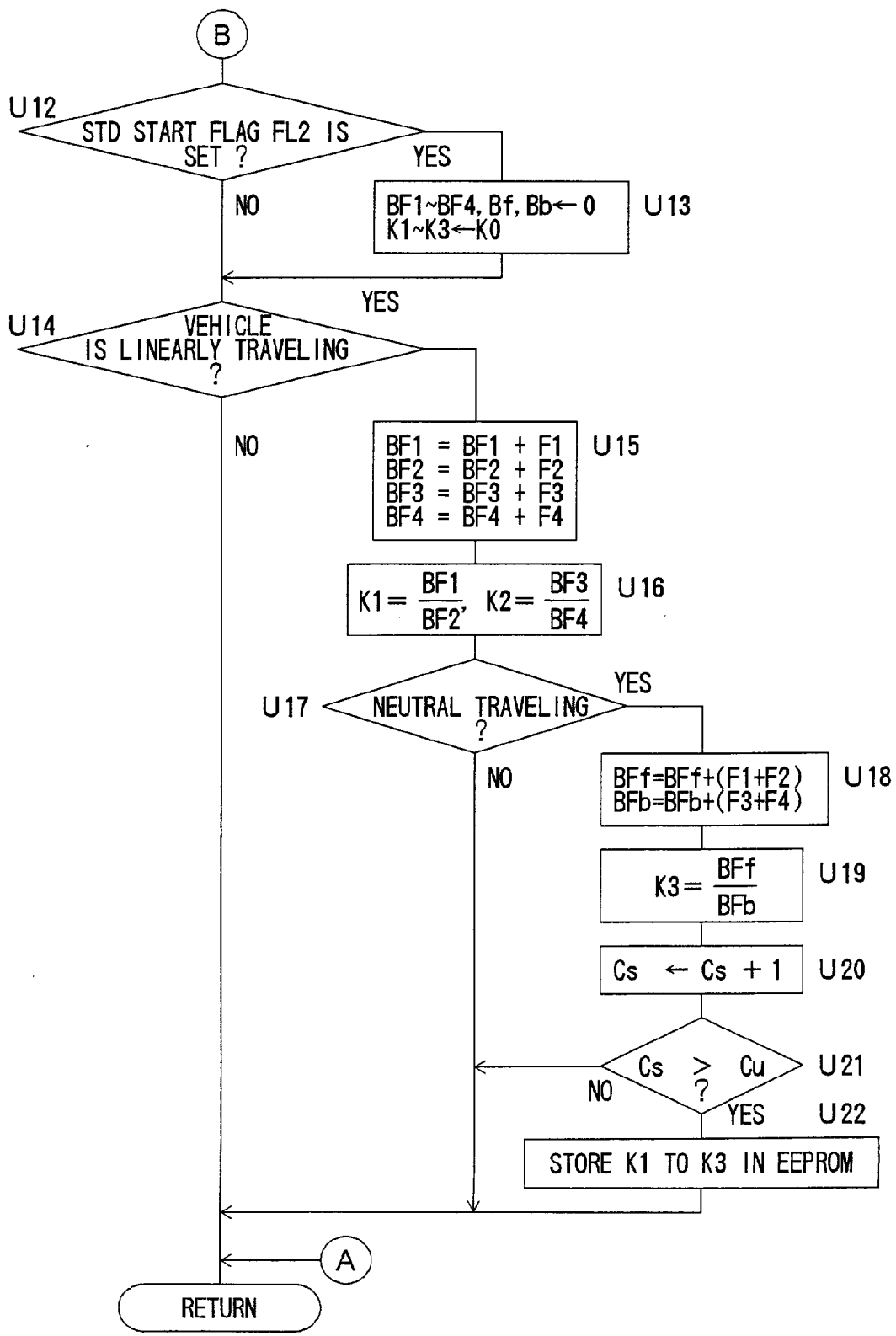

FIGS. 5 and 6 are flow charts for explaining the STD processing. The CPU 2b detects the rotational angular velocity Fi of each of the tires Wi on the basis of the wheel speed pulses outputted from the corresponding wheel speed sensor 1 (step U1 in FIG. 5).

The rotational angular velocity Fi of each of the tires Wi may, in some cases, include an error depending on the speed of the vehicle (vehicle speed) V and the front/rear acceleration FRAi of the tire Wi. That is, when the vehicle speed V is significantly low, the detection precision of the vehicle speed sensor 1 is significantly degraded, so that it is highly possible that the rotational angular velocity Fi includes a large error. When the front/rear acceleration FRAi of the tire Wi is relatively high, it is highly possible that the rotational angular velocity Fi include a large error by the effect of the slip of the tire Wi due to rapid acceleration/rapid deceleration of the vehicle or a foot brake. In this case, the rotational angular velocities Fi must be rejected without being used for the calculation of the initial correction factors K1 to K3 because they vary depending on factors other than the initial difference.

The CPU 2b calculates the vehicle speed V and the front/rear acceleration FRAi of each of the tires Wi after detecting the rotational angular velocities Fi. More specifically, the CPU 2b calculates the vehicle speed V in accordance with the following equation (7) on the basis of the speed Vi of each of the tires Wi calculated by the following equation (6):

$$Vi = r \times Fi \tag{6}$$

$$V = (V1 + V2 + V3 + V4)/4 \tag{7}$$

The front/rear acceleration FRAi of each of the tires Wi is calculated in accordance with the following equation (8). In the following equation (8), BVi denotes the speed of each of the tires Wi calculated in the preceding sampling period:

$$FRAi = (Vi - BVi)/(\Delta T \times 9.8) \tag{8}$$

The CPU 2b judges whether or not the rotational angular velocities Fi detected in the current sampling period should be rejected on the basis of the vehicle speed V and the front/rear acceleration FRAi of each of the tires Wi which are calculated (step U2). Specifically, when either one of the following conditions (1) and (2) is true, the rotational angular velocities Fi are rejected:

$$V < Vth \text{ (for example, } Vth=10 \text{ (km/h))} \tag{1}$$

$$\text{MAX } \{|FRAi|\} > Ath \tag{2}$$

where MAX {|FRAi|} denotes the maximum value of |FRA1|, |FRA2|, |FRA3| and |FRA4|. (for example, Ath=0.1 g : g=9.8 (m/sec²)) When the rotational angular velocities Fi are not rejected, the CPU 2b judges whether or not the STD abnormal termination flag FL1 is set in order to judge whether or not the STD processing is further performed (step U3). If the STD abnormal termination flag FL1 is set, the STD processing is inhibited from being further performed, to make an attempt to terminate the STD processing. When the STD abnormal termination flag FL1 has been set before the ignition switch is turned on this time, and a certain time period has elapsed since the flag was set, the air pressure of the tire whose air pressure has dropped may have been returned to normal internal pressure by filling the tire with air. Therefore, the CPU 2b judges whether or not the air pressure is returned to normal internal pressure on the basis of the judged value D found in the normal judgment processing (steps U4 and U5). If the air pressure has been returned to normal internal pressure, the STD start flag FL2 is set (step U6), and the STD abnormal termination flag FL1 is further cleared (step U7), to terminate the STD processing once. If the air pressure has not returned to normal internal pressure, the STD processing is terminated once without performing any processing.

On the other hand, if the STD abnormal termination flag FL1 is not set, it is then judged whether or not a warning provision flag FL3 is set (step U8). The warning provision flag FL3 is set when it is judged that the air pressure of any of the tires has dropped in the normal judgment processing. If the warning provision flag FL3 is tested, therefore, it can be judged whether or not the air pressure of any of the tires has dropped. If the warning provision flag FL3 is not set, it can be considered that all the tires have normal internal pressure, thereby performing the further processing. If the warning provision flag FL3 is set, it can be considered that the air pressure of any of the tires has dropped, thereby stopping the STD processing. In this case, in order to indicate that the STD processing is stopped, the STD abnormal termination flag FL1 is set, and is stored in the EEPROM 2e (step U9). The sign of a judged value D, which is to be a parameter in judging whether or not the air pressure of the tire whose air pressure has dropped is returned to normal internal pressure, is stored in the EEPROM 2e (step U10). Further, the initial correction factors K1 to K3 so far found are stored in the EEPROM 2e (step U11). Thereafter, the STD processing is terminated once.

When the warning provision flag FL3 is not set, the CPU 2b judges whether or not the STD start flag FL2 is set (step U12 in FIG. 6). If the STD start flag FL 2 is set, it is considered that the air pressure of the tire whose air pressure has dropped has returned to normal internal pressure. In order to calculate the initial correction factors K1 to K3 from the beginning, therefore, the initial correction factors K1 to K3 are set to their initial value K0 (for example, K0=1.0), and the buffers B1 to B4 as well as Bf and Bb used for calculating the initial correction factors K1 to K3 are cleared (step U13). Thereafter, the STD start flag FL2 is cleared. If the STD start flag FL 2 is not set, the processing proceeds further without the above-mentioned initialization.

Factors other than the initial difference of the variation among the rotational angular velocities include not only the vehicle speed V and the front/rear acceleration FRAi of each of the tires Wi but also the lateral acceleration exerted on the vehicle in a case where the vehicle is cornering. When the vehicle is cornering, therefore, the rotational angular velocity detected in the current sampling period must be rejected.

Therefore, the CPU 2b judges whether or not the vehicle is linearly traveling (step U14). More specifically, the lateral acceleration LA of the vehicle is first calculated in accordance with the following equation (9) on the basis of the vehicle speed V and the turning radius R of the vehicle:

$$LA = \frac{V^2}{R \times 9.8} \tag{9}$$

It is then judged whether or not the calculated lateral acceleration LA of the vehicle falls within a predetermined allowable range ΔG. Unless the lateral acceleration LA of the vehicle falls within the allowable range ΔG, it can be considered that the vehicle is not linearly traveling, thereby terminating the STD processing once. If the lateral acceleration LA of the vehicle falls within the allowable range ΔG, it is considered that the vehicle is linearly traveling, thereby starting the calculation of the initial correction factors K1 and K2 out of the initial correction factors K1 to K3.

The reason why the calculation of the initial correction factor K3 is not started at this timing is that the initial correction factor K3 is found on the basis of the ratio of the rotational angular velocities of the front and rear tires, unlike the initial correction factors K1 and K2. That is, even when the vehicle is linearly traveling, the driving tires may slip at the time of driving and braking the vehicle, and the effect of the slip is exerted on the ratio of the rotational angular velocities of the front and rear tires in this case.

The CPU 2b adds the rotational angular velocities F1 and F2 of the right and left front tires which are detected in the current sampling period to accumulated values BF1 and BF2 obtained in the previous STD processing which are stored in the buffers B1 and B2, to obtain new accumulated value BF1 and BF2, as expressed by the following equations (10) and (11). Similarly, the CPU 2b adds the rotational angular velocities F3 and F4 of the right and left rear tires to accumulated values BF3 and BF4 obtained in the previous STD processing which are stored in the buffers B3 and B4, to obtain new accumulated values BF3 and BF4, as expressed by the following equations (12) and (13) (step U15):

$$BF1=BF1+F1 \tag{10}$$

$$BF2=BF2+F2 \tag{11}$$

$$BF3=BF3+F3 \tag{12}$$

$$BF4=BF4+F4 \tag{13}$$

The initial correction factors K1 and K2 are found, as expressed by the following equations (14) and (15), on the basis of the found accumulated values BF1 and BF2 as well as BF3 and BF4 (step U16):

$$K1=BF1/BF2 \tag{14}$$

$$K2=BF3/BF4 \tag{15}$$

The CPU 2b then judges whether or not the vehicle is being subjected to neutral traveling in which no driving torque and braking torque are exerted, in order to find the initial correction factor K3 (step U17). Specifically, the front/rear acceleration FRA of the vehicle is found in accordance with the following equation (16) on the basis of the front/rear acceleration FRAi of each of the tires Wi found in the judgment processing in the step U2, and it is judged whether or not the found front/rear acceleration FRA of the vehicle falls within a predetermined neutral range $\Delta A$ (for example, $\Delta A=-0.01$ to $-0.05$).

$$FRA=(FRA1+FRA2+FRA3+FRA4)/4 \tag{16}$$

If the vehicle is not being subjected to neutral traveling, it can be considered that the effect of the slip is exerted on the respective rotational angular velocities F1 and F2 of the driving tires W1 and W2, thereby terminating the STD processing once. On the contrary, if the vehicle is being subjected to neutral traveling, it can be considered that the effect of the slip is not exerted on the respective rotational angular velocities F1 and F2 of the driving tires W1 and W2, thereby starting the calculation of the initial correction factor K3.

Specifically, the CPU 2b adds the total (F1+F2) of the respective rotational angular velocities F1 and F2 of the right and left front tires W1 and W2 to the preceding accumulated value BFf stored in the buffer Bf, to obtain a new accumulated value BFf, as expressed by the following equation (17). Similarly, the CPU 2b adds the total (F3+F4) of the respective rotational angular velocities F3 and F4 of the right and left rear tires W3 and W4 to an accumulated value BFb stored in the buffer Bb, to obtain a new accumulated value BFb, as expressed by the following equation (18) (step U18):

$$BFf=BFf+(F1+F2) \tag{17}$$

$$BFb=BFb+(F3+F4) \tag{18}$$

The ratio of the accumulated values BFf and BFb is found as expressed by the following equation (19) (step U19). Consequently, the initial correction factor K3 is obtained.

$$K3=BFf/BFb \tag{19}$$

Thereafter, the count value Cs of the STD counter C1 for recording the number of times of the calculation of the initial correction factors K1 to K3 is incremented by one (step U20). It is then judged whether or not the count value Cs reaches the maximum value Cu (step U21). If the count value Cs reaches the maximum value Cu, it is considered that the final initial correction factors K1 to K3 have been found. In order to leave the initial correction factors K1 to K3 even after the ignition switch is turned off, therefore, the initial correction factors K1 to K3 are stored in the EEPROM 2e (step U22). Unless the count value Cs has reached the maximum value Cu, the STD processing is terminated once without performing any further processing.

Figure 7:
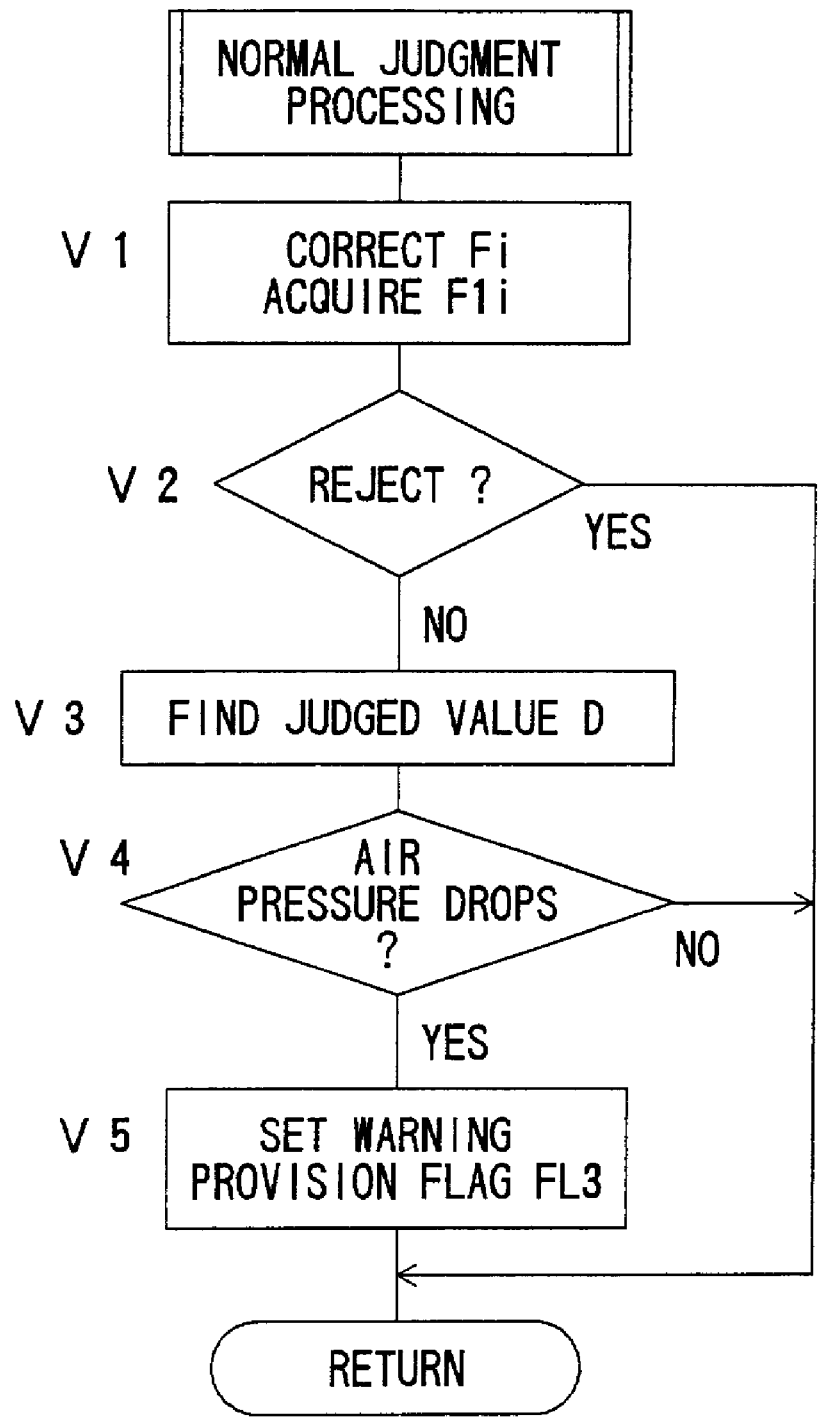
FIG. 7 is a flow chart for explaining normal judgment processing.

FIG. 7 is a flow chart for explaining the normal judgment processing. The CPU 2b corrects the rotational angular velocities Fi of the tires Wi in accordance with the following equations (20) to (23) using the initial correction factors K1 to K3 found in the STD processing, to find new rotational angular velocities F1i (step V1):

$$F11=F1 \tag{20}$$

$$F12=K1\times F2 \tag{21}$$

$$F13=K3\times F3 \tag{22}$$

$$F14=K2\times K3\times F4 \tag{23}$$

When the final initial correction factors are not found, used as the initial correction factors K1 to K3 are temporary initial correction factors found in the present sampling period $\Delta T$. On the other hand, when the final initial correction factors have been already found, the final initial correction factors are used. Further, when the calculation of the initial correction factors is stopped halfway, the initial correction factors stored in the EEPROM 2e at that time are used.

An error is included in the rotational angular velocity F1i of each of the tires Wi in cases such as a case of where the vehicle speed V is significantly low, a case where the front/rear acceleration FRAi of the tire Wi is relatively high, a case where the turning radius of the vehicle is relatively small, and the lateral acceleration LA of the vehicle is relatively high. In this case, the rotational angular velocities F1i must be rejected without being used for judging the drop in the air pressure or the tire Wi because they do not faithfully represent the air pressure.

The CPU 2b calculates the speed Vri of each of the tires Wi in accordance with the following equation (24) on the basis of the rotational angular velocities F1i after the correction, and calculates the vehicle speed Vr in accordance with the following equation (25) on the basis of the calculated speed Vri:

$$Vri=r\times F1i \tag{24}$$

$$Vr=(F11+F12+F13+F14)/4 \tag{25}$$

The CPU 2b calculates the front/rear acceleration FRAri of each of the tires Wi in accordance with the following equation (26) on the basis of the vehicle speed Vr and the speed BVri of the vehicle which is calculated in the preceding sampling period:

$$FRAri=(Vri-BVri)/(\Delta T\times 9.8) \tag{26}$$

Furthermore, the CPU 2b calculates the turning radius Rr of the vehicle in accordance with the following equation (27) on the basis of the vehicle speed Vr:

$$Rr = \frac{Tw}{2} \times \frac{Vr4 + Vr3}{Vr4 - Vr3} \quad (27)$$

Furthermore, the CPU 2b calculates the lateral acceleration LAr of the vehicle in accordance with the following equation (28) on the basis of the vehicle speed Vr:

$$LAr = \frac{Vr^2}{Rr \times 9.8} \quad (28)$$

The CPU 2b judges whether or not the rotational angular velocity F1i of each of the tires Wi which is calculated in the current sampling period should be rejected on the basis of the vehicle speed Vr, the front/rear acceleration FRAri of the tire Wi, the turning radius Rr of the vehicle and the lateral acceleration LAr of the vehicle which are calculated. That is, when any one of the following four conditions (1) to (4) is true, the rotational angular velocities F1i are rejected.

$Vr < Vth$ (1)

MAX $\{|FRAri|\} > Ath$ (2)

$|Rr| < Rth$ (for example, $Rth = 30$ (m)) (3)

$|LAr| > Gth$ (for example, $Gth = 0.4$ (g)) (4)

When the rotational angular velocities F1i are not rejected, the judged value D is calculated in accordance with the following equation (29) on the basis of the rotational angular velocities F1i (step V3):

$$D = \frac{F11 + F14 - F12 - F13}{F11 + F12 + F13 + F14} \times 200 \quad (29)$$

It is then judged whether or not the air pressure of any of the tires $W_i$ has dropped on the basis of the calculated judged value D (step V4). Specifically, it is judged whether or not the judged value D satisfies the following expression (30). In the following expression (30), Dth1=Dth2=0.1, for example:

$D < -Dth$ or $D > Dth2$ (30)

When the judged value D satisfies the foregoing expression (30), it can be considered that the air pressure of any of the tires has dropped, so that the CPU 2b sets the warning provision flag FL3 (step V5). When the judged value D does not satisfy the foregoing expression (30), it can be considered that all the tires Wi have normal internal pressure, so that the CPU 2b does not set the warning provision flag FL3, terminating the normal judgment processing.

When it is judged that the air pressure of any of the tires has dropped, it is easier to understand for the driver to specify the tire whose air pressure has dropped to provide a warning than to merely provide a warning that the air pressure of any of the tires has dropped.

Therefore, the CPU 2b specifies the tire whose air pressure has dropped after setting the warning provision flag FL3. More specifically, the following are specified on the basis of the sign of the judged value D found by the foregoing equation (29):

If D>0, the tire whose air pressure has dropped is W1 or W2.

If D<0, the tire whose air pressure has dropped is W2 or W3.

Furthermore, in this case, when the vehicle is linearly traveling, the tire whose air pressure drops is specified in the following manner:

If F11>F12, the tire whose air pressure has dropped is W1.
If F11<F12, the tire whose air pressure has dropped is W2.
If F13>F14, the tire whose air pressure has dropped is W3.
If F13<F14, the tire whose air pressure has dropped is W4.

The CPU 2b gives, when the tire whose air pressure has dropped is specified, the results thereof to the display 3, to display the results. The display 3 comprises indicator lamps respectively corresponding to the four tires W1, W2, W3 and W4, as shown in FIG. 2, for example. When it is detected that the air pressure of any of the tires has dropped, the indicator lamp corresponding to the tire specified as one whose air pressure has dropped is lighted up. A warning is thus provided.

Processing for judging whether or not the air pressure of the tire is retuned to normal internal pressure in the steps U4 and U5 of the STD processing will be then described in detail. The CPU 2b first judges whether or not the judged value D found in the normal judgment processing in the preceding sampling period satisfies the following equation (31) (step U4):

$|D| < Dth$ (31)

In the foregoing equation (31), Dth is set to a value smaller than the thresholds Dth1 and Dth2 used in the normal judgment processing. For example, Dth is set to 0.02. This is for the following reasons.

Specifically, when the air pressure of the tire drops immediately before the STD processing is terminated, the effect of the air pressure drop is not exerted on the initial correction factors K1 to K3 very much. When the air pressure of the tire is thereafter returned to normal internal pressure, therefore, the judged value D may take a value in the vicinity of zero. The initial correction factors K1 to K3 are not precisely correct, however. In order to eliminate such a case, therefore, the thresholds must be set to low values in the vicinity of zero.

If all the tires Wi have normal internal pressure, the judged value D takes a value in the vicinity of zero, as described in the above-mentioned normal judgment processing. Consequently, it can be judged whether or not the air pressure of the tire is returned to normal internal pressure by judging whether or not the judged value D satisfies the foregoing equation (31).

On the other hand, if the initial correction factors K1 to K3 have been found under situations where the air pressure of the tire has dropped, although it is returned to normal internal pressure, the judged value D may not, in some cases, satisfy the foregoing equation (31) by the great effect of deviation included in the initial correction factors K1 to K3.

In order to deal with the foregoing problem, the CPU 2b judges whether or not the sign of the judged value D which is a first judged value differs from the sign of the judged value D found at the time of abnormal termination which is a second judged value (hereinafter referred to as a "Judged value at abnormal time Du") (step U5).

For example, when the rotational angular velocities Fi of all the tires Wi in a case where all the tires Wi have normal internal pressure are equal, and all the initial correction factors K1 to K3 are set to 1.0 which is their initial value, the judged value D is found as given by the following equation (32) when the air pressure of the left front tire W1 drops after an STD time period (period until the STD processing is completed) has elapsed. In the following equation (32), dF1 denotes the amount of increase in the rotational angular velocity F1 of the left front tire W1 due to the drop in the air pressure of the left front tires W1:

$$D = \frac{dF1}{(4+dF1)} \times 200 \approx dF1 \times 50 \qquad (32)$$

On the other hand, when the air pressure of the left front tire W1 drops before the STD time period has elapsed, the initial correction factor K1 also changes as the rotational angular velocity F1 of the left front tire W1 increases. In this case, the judged value D is found as given by the following equation (33), letting dK1 be the amount of change in the initial correction factor K1. In this case, in the normal judgment processing, it is judged that the air pressure of any of the tires has dropped, so that the warning provision flag FL3 is set. In STD processing in the succeeding sampling period, therefore, the calculation of the initial correction factors is abnormally terminated halfway.

$$D = \frac{\{(1+dF1)+1-(1+dK1)-1\}}{\{(1+dF1)+(1+dK1)+1+1\}} \times 200 \qquad (33)$$
$$= \frac{(dF1-dK1)}{(4+dF1+dK1)} \times 200 \approx (dF1-dK1) \times 50$$

Thereafter, when the left front tire Wi is filled with air, so that the air pressure of the left front tire W1 is returned to normal internal pressure, the rotational angular velocity F1 of the left front tire W1 is returned to its original velocity. That is, dF1 reaches zero. On the contrary, the calculation of the initial correction factors is stopped, so that the amount of increase dK1 in the initial correction factor Ki is unchanged. When the air pressure of each of the tires is normal after the abnormal termination, therefore, the judged value D is found in the following manner:

$$D=\{(-dF1)/(4+dF1)\} \times 200 \approx -dF1 \times 50 \qquad (34)$$

When the air pressure is thus returned to normal internal pressure after the STD processing is abnormally terminated halfway, the sign of the judged value D is reverse to that of the judged value at abnormal time Du. If the signs of the judged value D and the judged value at abnormal time Du are compared with each other, it can be judged whether or not the air pressure is returned to normal internal pressure.

As described in the foregoing, according to the present embodiment, when the air pressure of any of the tires drops during the STD processing, the STD processing is interrupted. Therefore, it is possible to minimize the effect of the drop in the air pressure on the initial correction factors K1 to K3. Consequently, the variation among the rotational angular velocities F1 to be thereafter corrected can be minimized, so that the number of times of erroneous judgment of the drop in the air pressure can be minimized. Moreover, even after the air pressure is returned to normal internal pressure, the fact is automatically detected, so that the calculation of the initial correction factors K1 to K3 is automatically resumed from the beginning. Without the driver's complicated operation, therefore, it is possible to obtain the correct initial correction factors K1 to K3. Accordingly, the tire pressure drop detecting device can be a convenient device for use.

Even when it cannot be detected that the air pressure is returned to normal internal pressure on the basis of the judged value D, it can be judged that the air pressure is returned to normal internal pressure if the number of times of turn-on of the ignition switch is not less than a predetermined number of times, so that the calculation of the initial correction factors K1 to K3 can be reliably resumed.

Although description has been made of one embodiment of the present invention, the present invention is not limited to the above-mentioned embodiment. For example, in the above-mentioned embodiment, when it is automatically detected that the air pressure of the tire whose air pressure has dropped is returned to normal internal pressure after the STD processing is abnormally terminated, the calculation of the initial correction factors is automatically resumed from the beginning. However, the STD processing may be resumed from the beginning in response to the pressing of the STD switch 4 after reporting to the driver that the STD processing is abnormally terminated. According to this construction, the driver may press the STD switch 4 only when the STD processing is abnormally terminated, so that the driver need not perform complicated operation, as compared with a case where the STD switch 4 is pressed every time a warning for the drop in air pressure is provided.

Although the present invention has been described and illustrated in detail, it is clearly understood that the same is by way of illustration and example only and is not to be taken by way of limitation, the spirit and scope of the present invention being limited only by the terms of the appended claims.

This application claims priority benefits under 35 USC § 119 of Japanese Patent Application Serial No. 9-53612 filed in the Japanese Patent Office on Mar. 7, 1997, the disclosure of which is incorporated herein by reference.

What is claimed is:

1. A device for detecting a drop in air pressure of any of tires mounted on a vehicle, comprising:

rotational angular velocity detection means for detecting a rotational angular velocity of each of the tires for each of predetermined sampling periods;

initial correction factor calculation means for finding an initial correction factor for eliminating an effect of a difference in effective rolling radius depending on an initial difference among the tires on the rotational angular velocities, the initial correction factor calculation means including means for finding as the initial correction factor a ratio of the rotational angular velocities of a predetermined pair of the tires on the basis of the rotational angular velocities detected by the rotational angular velocity detection means, means for averaging and updating the initial correction factor for each sampling period, and means for taking the initial correction factor found when a number of times of the updating reaches a predetermined number of times as a final initial correction factor;

correction means for correcting the rotational angular velocities detected by the rotational angular velocity detection means for each sampling period on the basis of the initial correction factor found by the initial correction factor calculation means;

judgment means for finding a judged value on the basis of the rotational angular velocities corrected by the correction means and judging whether the air pressure of any of the tires has dropped on the basis of the found judged value; and calculation stop means for stopping operation of the initial correction factor calculation means when it is judged by the judgment means that the air pressure of any of the tires has dropped before the final initial correction factor is taken in the initial correction factor calculation means.

2. A tire pressure drop detecting device according to claim 1, further comprising
- range judgment means for judging whether the judged value found by the judgment means is less than a predetermined value after the operation of the initial correction factor calculation means is stopped by the calculation stop means, and
- calculation resumption processing means for judging that the air pressure of the tire is returned to normal internal pressure when it is judged in the range judgment means that the judged value is less than the predetermined value and performing processing relating to the resumption of the operation of the initial correction factor calculation means.

3. A tire pressure drop detecting device according to claim 2, wherein
- the calculation resumption processing means automatically resumes the operation of the initial correction factor calculation means from a beginning point.

4. A tire pressure drop detecting device according to claim 1, further comprising
- sign judgment means for judging whether or not the sign of a judged value found by the judgment means after the operation of the initial correction factor calculation means is stopped by the calculation stop means (hereinafter referred to as a "first judged value") differs from the sign of a judged value found by the judgment means when the operation of the initial correction factor calculation means is stopped by the calculation stop means (hereinafter referred to as a "second judged value"); and
- calculation resumption processing means for judging that the air pressure of the tire is returned to normal internal pressure when it is judged by the sign judgment means that the sign of the first judged value and the sign of the second judged value differ from each other and performing processing relating to the resumption of the operation of the initial correction factor calculation means.

5. A tire pressure drop detecting device according to claim 1, further comprising
- power supply turn-on judgment means for judging whether or not a power supply is turned on not fewer than a predetermined number of times after the operation of the initial correction factor calculation means is stopped by the calculation stop means; and
- calculation resumption processing means for judging that the air pressure of the tire is returned to normal internal pressure when it is judged by the power supply turn-on judgment means that the power supply is turned on not fewer than a predetermined number of times and performing processing relating to the resumption of the operation of the initial correction factor calculation means.

* * * * *